United States Patent [19]

Kabaya

[11] Patent Number: 5,155,355
[45] Date of Patent: Oct. 13, 1992

[54] PHOTOELECTRIC ENCODER HAVING A GRATING SUBSTRATE WITH INTEGRAL LIGHT EMITTING ELEMENTS

[75] Inventor: Yoshihiko Kabaya, Sagamihara, Japan

[73] Assignee: Mitutoyo Corporation, Tokyo, Japan

[21] Appl. No.: 684,925

[22] PCT Filed: Sep. 5, 1990

[86] PCT No.: PCT/JP90/01138

§ 371 Date: Apr. 25, 1991

§ 102(e) Date: Apr. 25, 1991

[87] PCT Pub. No.: WO91/03711

PCT Pub. Date: Mar. 21, 1991

[51] Int. Cl.$^5$ .................. G01B 11/00; G08C 9/06
[52] U.S. Cl. .................. 250/237 G; 250/211 K; 250/231.16
[58] Field of Search ......... 250/211 K, 231.14, 231.16, 250/237 G; 356/374; 341/13

[56] References Cited

U.S. PATENT DOCUMENTS

| | | | |
|---|---|---|---|
| 2,879,405 | 3/1959 | Pankove | 250/211 K |
| 2,997,630 | 8/1961 | Kruse | 250/211 K |
| 3,129,416 | 4/1964 | Freedman | 250/211 K |
| 3,892,961 | 7/1975 | Bachmann | 250/211 K |
| 3,936,187 | 2/1976 | Momose | 250/211 K |
| 4,019,196 | 4/1977 | Teshima et al. | 357/17 |
| 4,499,374 | 2/1985 | Kabaya | 356/395 |
| 4,593,187 | 6/1986 | Grotts et al. | 250/211 K |
| 4,879,939 | 10/1989 | Nishimoto et al. | 250/211 K |
| 4,963,733 | 10/1990 | Spaulding | 250/237 G |

FOREIGN PATENT DOCUMENTS 2192753 7/1987 United Kingdom .

Primary Examiner—David C. Nelms
Assistant Examiner—S. Allen
Attorney, Agent, or Firm—Oliff & Berridge

[57] ABSTRACT

A photoelectric encoder characterized in that the grating substrate on the light emission side is composed of a plate-like light emitting element and in that light shielding members in the form of a thin film are arranged at regular intervals on the surface of the substrate which faces the reference grating. Since the light emitting element and the grating substrate on the light emission side are integrally provided with each other, reducing in the size and the weight of the apparatus and the number of parts is enabled.

10 Claims, 4 Drawing Sheets

PHOTOELECTRIC ENCODER HAVING A GRATING SUBSTRATE WITH INTEGRAL LIGHT EMITTING ELEMENTS

BACKGROUND OF THE INVENTION

1. Field of the Invention

The present invention relates to a photoelectric encoder and, more particularly, to the improvement of a scale and an optical system.

2. Description of the Prior Art

Various kind of encoders are used for various measuring machine, tools and, recently, information apparatuses for the purpose of detecting the displacement between two members which relatively move. Especially, photoelectric encoders are used in various fields because they can detect displacement in a noncontact state.

A photoelectric encoder is composed of a grating provided on each of the two members which relatively move, and a light emitting element and a light receiving element for detecting the overlap of the two gratings.

As conventional photoelectric encoders, what is called a three-grating type photoelectric encoder (Journal of the Optical Society of America, 1965, vol. 55, No. 4, pp. 373 to 381) for detecting the displacement from a change in the overlap between three gratings, as shown in FIG. 7, and a reflection type photoelectric encoder (Japanese Patent Laid-Open No. 198814/1982) such as that shown in FIG. 8 are known as well as ordinary encoders for detecting the overlap of two gratings.

A three-grating type encoder 10 shown in FIG. 7 includes a grating 12 on the light emission side and a grating 14 on the detection side which are arranged in parallel with each other, a reference grating 16 which is inserted between the gratings 12, 16 in parallel therewith in such a manner as to be relatively movable, a light emitting element 18 disposed on the left-hand side of the grating 12 in the drawing, and a light receiving element 20 disposed on the right-hand side of the grating 14 in the drawing.

The light emitted from the light emitting element 18 reaches the light receiving element 20 through the grating 12 on the light emission side, the reference grating 16 and the grating 14 on the detection side. The projected light is restricted by each of the gratings 12, 14 and 16, and photoelectrically converted by the light receiving element 20. The converted signal is further amplified by a preamplifier 22 and produced as detection signal s.

When the reference grating 16 relatively moves to the grating 12 on the light emission side and the grating 14 on the detection side, for example, in the direction indicated by the arrow X, the quantity of light emitted from the light emitting element 18 and shielded by the gratings 12, 16 and 14 gradually varies, and the detection signal s is output in the form of substantially a sine wave.

The pitch $P_1$ of the reference grating 16 corresponds to the wavelength P of the detection signal s, so that the amount of relative movement of the reference grating 16 is measured from the wavelength of the detection signal s and a divided value thereof.

It is therefore possible to detect the amount of relative movement of a main scale 24 and index scales 26 by disposing the reference grating on the main scale 24 and the grating 12 on the light emission side and the grating 14 on the detection side on the respective index scales 26.

FIG. 8 shows a reflection type photoelectric encoder 10. The same numerals are provided for the elements which correspond to those shown in FIG. 7 and explanation thereof will be omitted.

In this example, the main scale 24 and the index scale 26 are made of light transmissive glass, the main scale 24 being provided thereon with the reference grating 16 made of a reflective material and the index scale 26 being provided thereon with the light receiving elements 20 in the form of a grating.

In this way, slits corresponding to those formed between the grating 12 on the light emission side and the grating 14 on the detection side in FIG. 7 are formed on the index scale 26.

The light from the light emitting element 18 is adjusted to parallel rays by a collimator lens 28 and projected from the back surface of the index scale 26.

As a result, the light is transmitted only through the portion at which the light receiving element 20 is not formed and projected onto the main scale 24.

The light reflected by the reference grating 16 on the main scale 24 proceeds again toward the index scale 26 and it is photoelectrically converted by the light receiving elements 20.

On the other hand, the light projected onto the gaps of the reference grating 16 is transmitted through the main scale 24, which is made of glass, and does not reach the light receiving elements 20.

In this way, the amount of relative movement of the main scale 24 and the index scale 26 is detected by the light receiving elements 20 as a substantially sine wave in the same way as in the system shown in FIG. 7.

However, in the three-grating type transmission photoelectric encoder shown in FIG. 7, since it is necessary to dispose the light emitting element 18 and the light receiving element 20 on the outsides of the scales 24 and 26, the number of parts required is large, which makes the manufacture of apparatus complicated, and the total size becomes inconveniently large.

This is the same with the reflection type photoelectric encoder shown in FIG. 8. Especially, in this system, since it is necessary to provide the collimator lens 28 for distributing light, the apparatus inevitably has a large size.

SUMMARY OF THE INVENTION

Accordingly, it is an object of the present invention to eliminate the above-described problems in the prior art and to provide a photoelectric encoder which has a simple mechanism, a small size and a light weight.

To achieve this aim, in one aspect of the present invention there is provided a photoelectric encoder comprising: a grating substrate on the light emission side which is made of plate-like light emitting element; and light shielding members arranged at regular intervals on the surface of the plate-like light emitting element which faces a reference grating.

It is preferable that an index scale is provided with a grating on the detection side which faces the grating on the light emission side through the reference grating.

It is also preferable to form the grating on the detection side from a light transmissive material and to arrange light receiving elements at regular intervals on the surface thereof which faces the reference grating.

The grating substrate on the light emission side is preferably composed of a laminate of semiconductor layers which have opposite polarities.

The surface of the grating substrate on the light emission side which does not face the reference grating is preferably covered with a light shielding material in the form of a thin film.

In another aspect of the present invention there is provided a photoelectric encoder comprising: a grating substrate on the light emission side which is made of a plate-like light element; and light receiving elements which are arranged in alignment at regular intervals on one surface of the plate-like light emitting element.

It is preferable that each of the light receiving elements is composed of laminated plate-like semiconductor layers which have opposite polarities with slits provided thereon at regular intervals.

It is also preferable that each of the light receiving elements is composed of a laminate plate-like semiconductor layers which have opposite polarities with slits provided thereon at regular intervals and that a signal leading material layer is formed on the surface of the light receiving element which faces a reference grating and on the border surface with the light emitting element.

The width of the slit is preferably not less than twice the height of the light receiving element measured from the surface of the light emitting element.

In a photoelectric encoder according to the present invention having the above-described structure, the light emitting is integrally provided with the grating substrate on the light emission side, thereby contributing to the reduction in the number of parts, size and weight.

In a reflection type photoelectric encoder, since the light receiving elements in the form of a grating are formed on the light emitting elements constituting the grating substrate on the light emission side, it is possible to constitute all of the light emitting element, the light receiving elements and the grating substrate on the light emission by one member, which further contributes to the reduction in the number of parts, size and weight.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained hereinunder with reference to the accompanying drawings.

Figure 1:
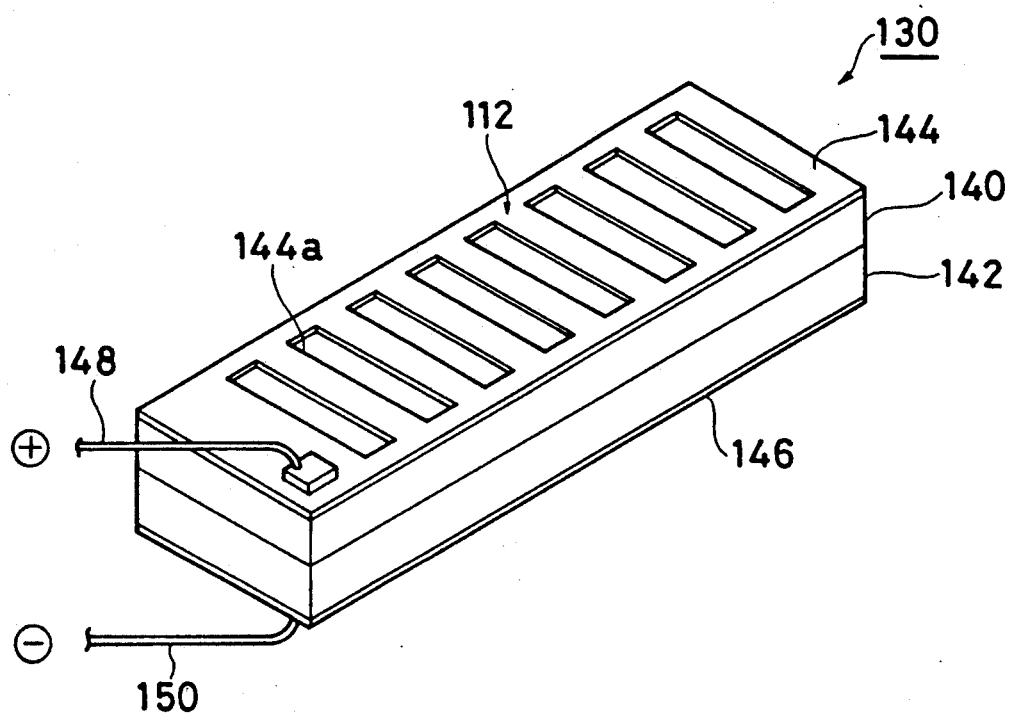
FIG. 1 is an explanatory view of a grating substrate on the light emission side which is used for a first embodiment of a photoelectric encoder according to the present invention.

FIG. 1 is a schematic perspective view of the external appearance of a grating substrate on the light emission side which is used for a first embodiment of a photoelectric encoder according to the present invention.

A grating substrate 130 on the light emission side is formed into a thin rectangular parallelepiped, and semiconductor layers 140, 142 having opposite polarities are laminated so as to form a junction surface for light emission therebetween.

In this embodiment, the first conductor layer 140 is composed of P-type GaAs and the second conductor layer 142 is composed of N-type GaAs. The junction surface mainly emits near infrared rays.

On the end surface of the semiconductor layers 140, 142, metal films 144, 146 for electrodes are formed respectively by deposition of gold.

To the metal films electrodes 144, 146, a high-voltage lead wire 148 and a low-voltage lead wire 150 are respectively connected by bonding, and holes and electrons are poured into the semiconductor layers 140, 142, respectively, through the respective electrodes.

The thus-poured holes and electrons are recombined with each other on the junction surface of the semiconductor layers 140, 142. At this time, light is emitted at a predetermined frequency by electronic excitation energy.

The present invention is characteristic in that such a light emitting element itself constitutes a grating substrate on the light emission side. For this purpose, the metal film 144 on the side on which the light is emitted to the outside constitutes a grating in this embodiment. That is, a plurality of slits 144a are provided at regular intervals in the metal film electrode 144.

Each of these slits 144a has a width of e.g., 10 μm and they are arranged at a pitch of, e.g., 20 μm.

The light from the junction surface is emitted to the outside from the slits 144a of the metal film electrode 144 so that the shape of the light flux of this light beam is determined by the shape of the opening of the slit 144a.

In this embodiment, the metal film electrode 146 on the opposite side covers the entire part of the end surface of the second semiconductor layer 142. The thicknesses of both semiconductor layers 140, 142 are thin and the side surfaces thereof are orthogonal to the junction surface. Consequently, the amount of light which leaks to the outside from the side surface is slight and the light from the junction surface can be emitted from the slits 144a with efficiency. It is naturally preferable to shield light by applying a black coating or the like to the side surfaces.

The polarities (P-type and N-type) of the semiconductor layers 140, 142 may be reversed in the present invention.

Although near infrared rays are emitted in this embodiment, it is also preferable to use GaP, (GaAl)As or the like as a semiconductor so as to enable the emission of visible light, if necessary.

For the formation of the metal film for an electrode, sputtering or other techniques may be used as well as deposition.

Figure 2:
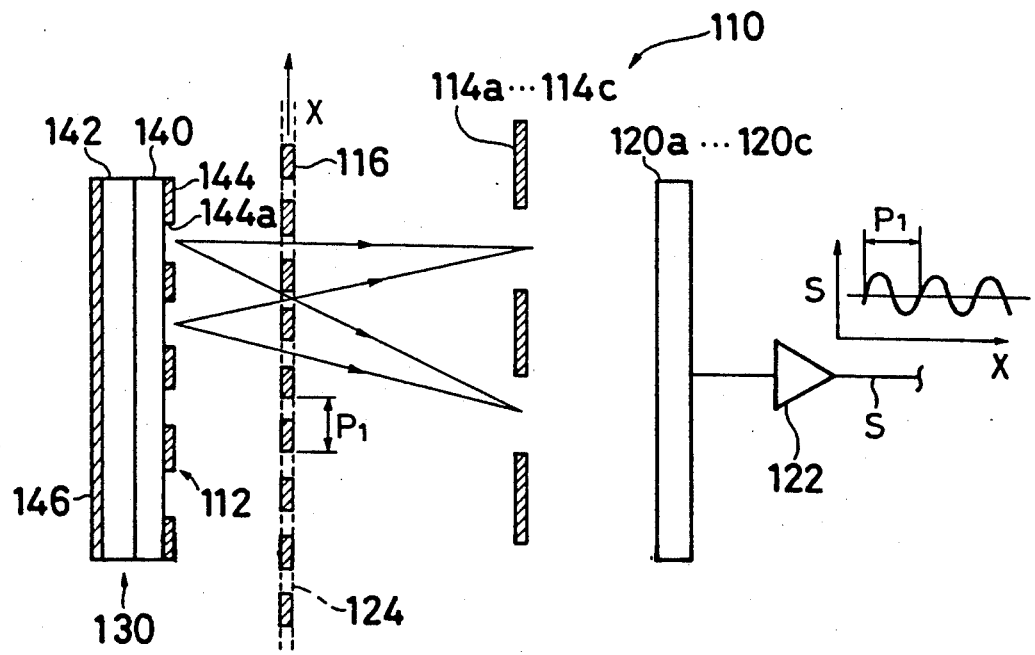
FIG. 2 schematically shows the structure of the first embodiment of a photoelectric encoder.

FIG. 2 shows the grating substrate 130 on the light emission side shown in FIG. 1 in the state of being applied to a photoelectric linear encoder.

The photoelectric linear encoder has a three-grating system. In other words, it is composed of a reference grating 116, a grating 112 on the light emission side and a grating 114 on the detection side, which relatively move in correspondence with the length of an object of measurement.

In this embodiment, the grating 114 on the detection side is provided with four detection gratings 114a, 114b, ... 114d each of which is composed of an index scale, and light receiving elements 120a, 120b, ... 120d are arranged in correspondence with the respective detection gratings. Vertical stripes which have a phase-shift of 90 degrees with respect to each other are formed on the respective detection gratings 114a, ... 114d. Therefore, signals of A-phase, B-phase, A'-phase and B'-phase which are shifted by $\pi/2$ from the precedent phase are obtained from the light receiving elements 120a, ... 120d, respectively. An output of A-phase which is amplified between A-phase and A'-phase and an output of B-phase which is amplified between B-phase and B'-phase are respectively obtained. By the direction of the phase shift between the output of A-phase and the output of B-phase of the like, the direction of relative movement of the scales is discriminated and the detection signals are electrically divided, thereby realizing the detection of displacement with high resolution.

Figure 7:
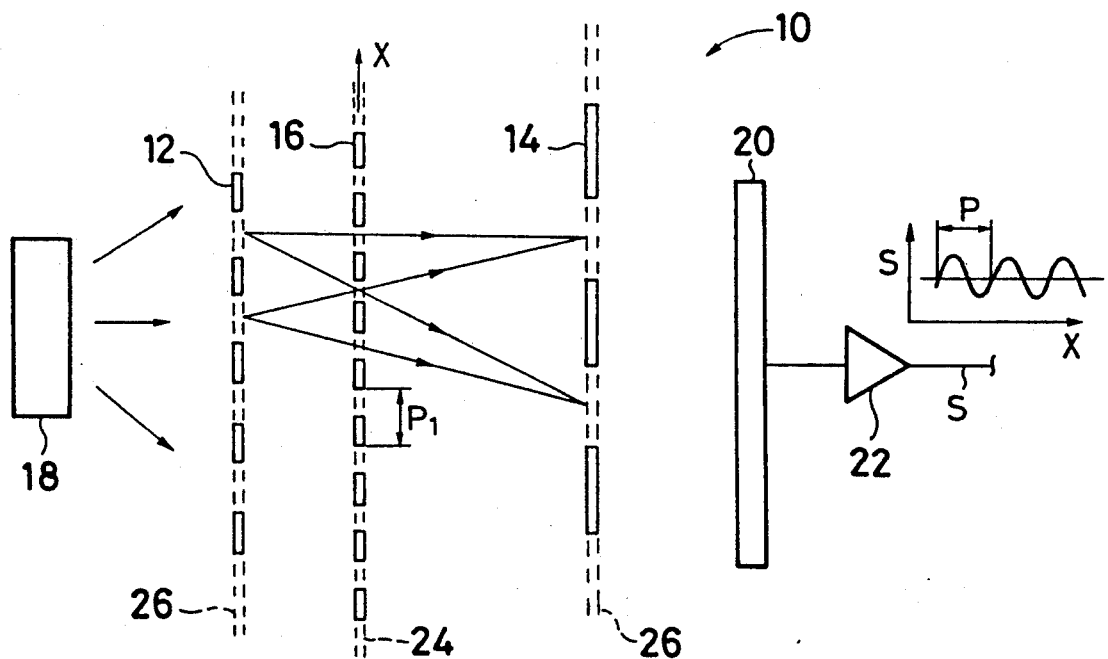
FIG. 7 schematically show the structure of a conventional three-grating type photoelectric encoder.
Figure 8:
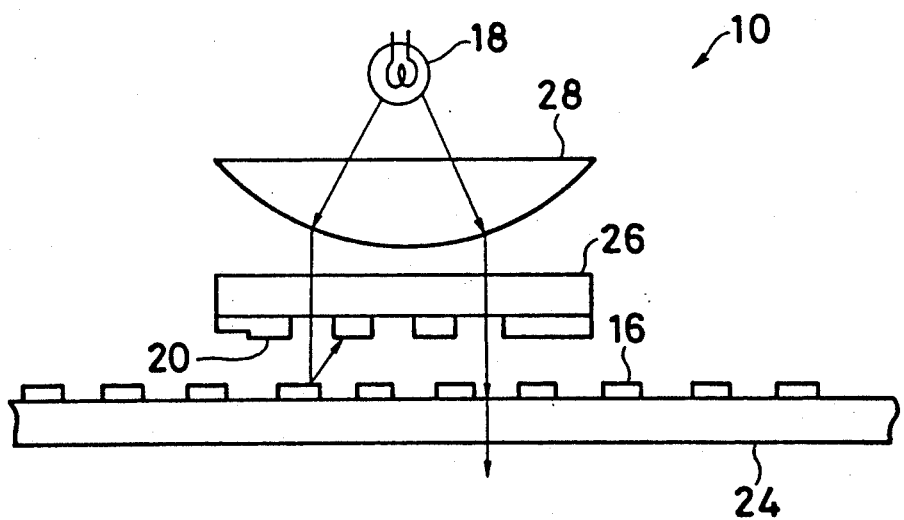
FIG. 8 schematically show the structure of a conventional reflection type photoelectric encoder.

In this embodiment, since the grating substrate 130 on the light emission side is made of a light emitting element and the grating 112 on the light emission side is formed directly on the light emitting element, as described above, the number of parts and the size of the apparatus are reduced in comparison with the conventional encoder shown in FIG. 7.

Figure 3:
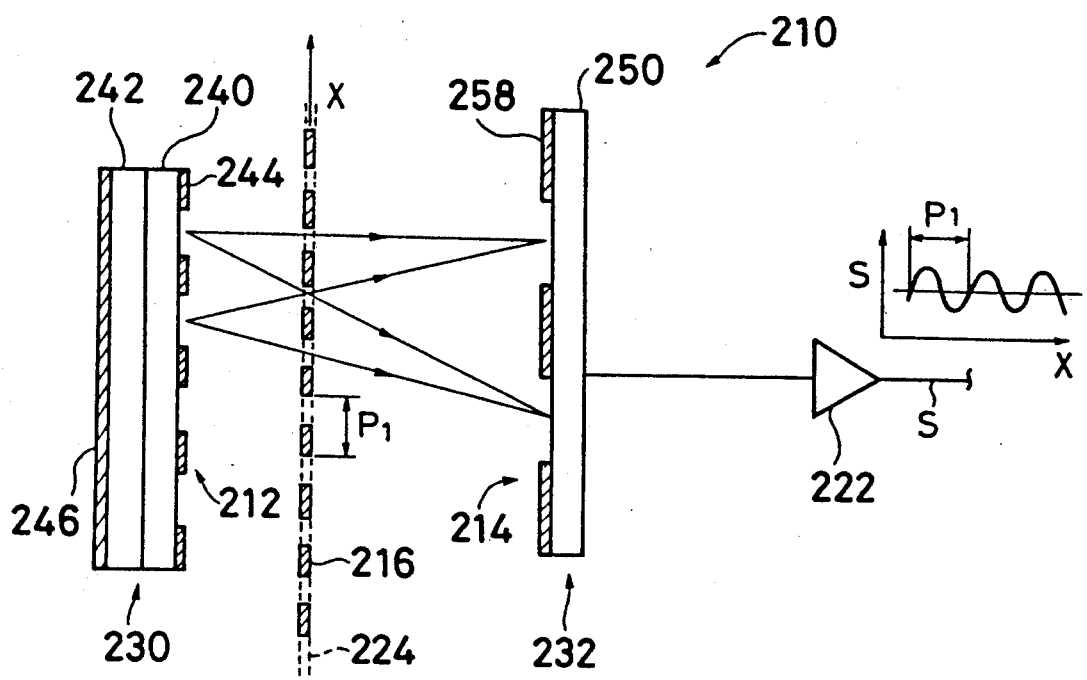
FIG. 3 schematically shows the structure of a second embodiment of a photoelectric encoder according to the present invention.

FIG. 3 schematically shows the structure of a second embodiment of a photoelectric encoder according to the present invention. The elements corresponding to those shown in FIG. 2 are indicated by the same numerals with the first FIG. 1 changed into 2, and explanation thereof will be omitted.

This embodiment is characterized in that a grating substrate 230 on the light emission side is made of a light emitting element and a grating substrate 232 on the detection side is integrally provided with a light receiving element.

Figure 4:
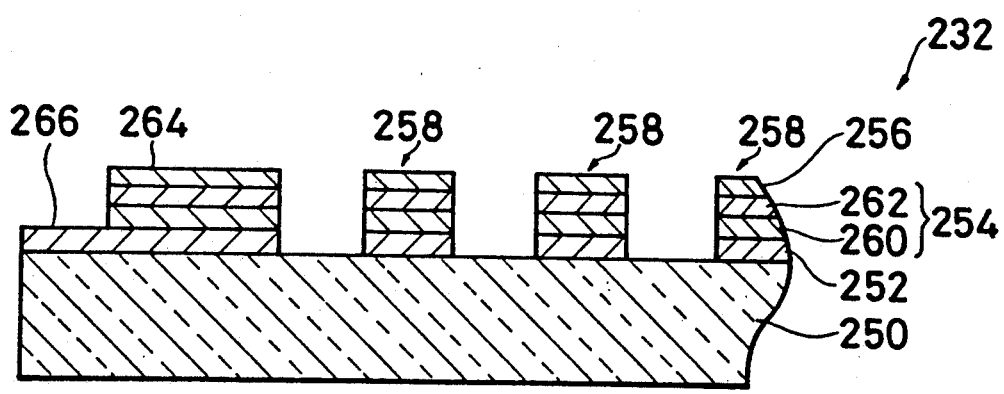
FIG. 4 is an explantory view of a grating substrate on the detection side which is used for the second embodiment shown in FIG. 3.

The grating substrate 232 on the detection side in this embodiment has a structure shown in FIG. 4.

In FIG. 4, the grating substrate 232 on the detection side is composed of a base 250 made of a light transmissive material such as glass and light receiving portions 258 which are formed in the shape of a narrow belt at regular intervals on the base 250. Each of the light receiving portions 258 is composed of a first signal leading material layer 252 made of, e.g., a metal film, a PN semiconductor layer 254 for converting light into an electric signal and a second signal leading material layer 256 made of a light transmissive and conductive material such as In$_2$O$_3$, SnO$_2$ and Si or mixture thereof which are laminated in that order.

The grating substrate 232 on the detection side is disposed with the light receiving portions 252 faced to a main scale 224. Each light receiving portion 258 functions as the light receiving element 120 and the slit of the grating 114 on the detection side in FIG. 2.

The light which has passed through the second signal leading material layer 256 of the light receiving portion 258 reaches the PN semiconductor layer 254, and it is photoelectrically converted on the boundary surface between an N-type amorphous silicon film 260 and a P-type amorphous silicon film 262 and taken out through output terminals 264, 266.

As described above, according to the second embodiment of a photoelectric encoder, since the grating substrate on the light emission side is integrally provided with the light emitting element and the grating substrate on the detection side is integrally provided with the light receiving element, the number of parts and the size and the weight of the apparatus are reduced.

Figure 5:
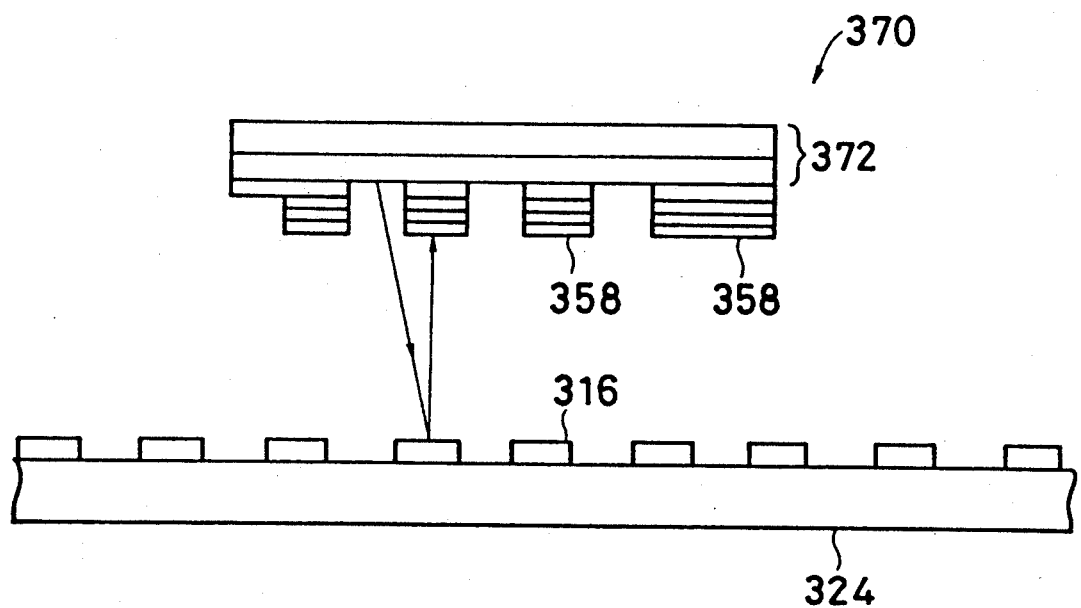
FIG. 5 is an explanatory view of a third embodiment of a photoelectric encoder according to the present invention.

FIG. 5 shows a third embodiment of a photoelectric encoder according to the present invention. The elements corresponding to those in the second embodiment are indicated by the same numerals with the first FIG. 2 changed into 3, and explanation thereof will be omitted.

This embodiment is characterized in that in a reflection type encoder, grating substrate on the light emission side, light emitting element, grating substrate on the detection side and light receiving element are integrally provided with each other.

In FIG. 5, an index scale 370 is composed of a substrate made of a long and narrow light emitting element 372 and light receiving portions 358 formed on one surface thereof.

The light emitted from the light emitting element 372 is reflected by a reference grating 316 of a main scale 324 and reaches the light receiving portions 358.

At this time, the light receiving portions 358 which are formed on the light emitting element 372 at regular intervals function as a grating on the light emission side, and since the light receiving portions 358 themselves are formed into a grating, they also function as a grating on the detection side.

Figure 6:
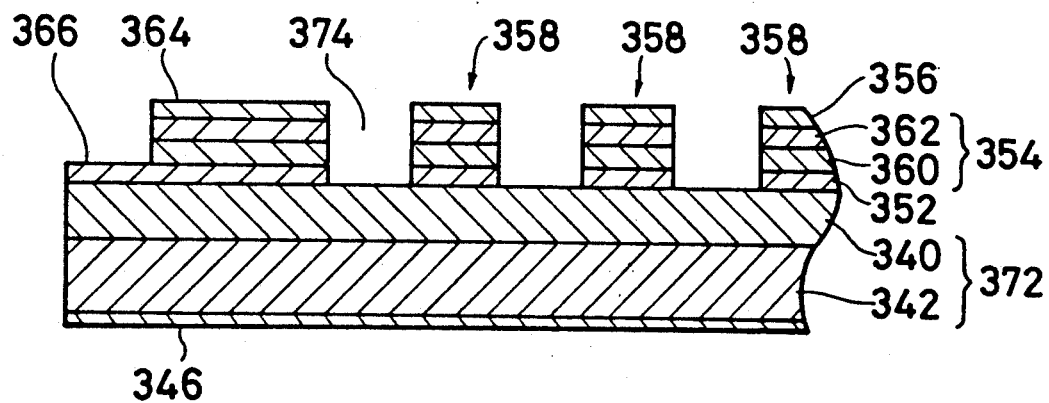
FIG. 6 is an explanatory view of an index scale used for the third embodiment shown in FIG. 5.

The detailed structure of the index scale 370 is shown in FIG. 6.

As is obvious from FIG. 6, the light emitting element 372 is composed of a P-type semiconductor layer 340 and an N-type semiconductor layer 342.

The light receiving portions 358 are formed at regular intervals on the long and narrow light emitting element 372.

The structure of each light emitting element 358 is as shown in FIG. 4.

A method of producing the index scale 370 in this embodiment will now be explained.

The long and narrow light emitting element 372 is first produced by an ordinary method. The light emitting element 372 is charged in a vacuum deposition apparatus and heated to 150° to 200° C. at a vacuum of $5 \times 10^{-6}$ torr to evaporate Cr from a tungsten board and to deposit it onto the light emitting element 372, thereby forming a Cr film of 2,000 to 3,000 angstrom thick as a first signal leading material layer 352.

The light emitting element 372 with the Cr film formed thereon is charged into a plasma chamber and heated to 300° C. Ar gas containing 10% of SiH$_4$ and diluted 10 times with H$_2$ gas was introduced into the chamber. By high-frequency glow discharge under a pressure of 0.1 to 2 torr, and N-type amorphous silicon (N-a-Si) film 360 and a P-type amorphous silicon (P-a-Si) film 362 were laminated on the first signal leading material layer 352, thereby forming a semiconductor layer 354 of about 1 μm thick.

The N-type amorphous silicon film 360 and the P-type amorphous silicon film 362 were deposited by mixing a trace amount of $PH_3$ with a reaction gas at the initial stage of deposition and by switching over $PH_3$ to $B_2H_6$ in the middle of deposition, respectively. PN semiconductor layer 354 can also be formed by other methods such as thermal decomposition and sputtering deposition.

The light emitting element 372 with the PN semiconductor layer 354 formed thereon is then inserted in a vacuum deposition tank and heated to 150° C. to deposit $In_2O_3$ accommodated in an alumina pot thereon to a thickness of about 1,000 angstrom by electron beam deposition, thereby forming a second signal leading material layer 356 on the PN conductor layer 354.

Thereafter photoresist is applied to a thickness of about 2 μm by spin coating and dried. After shielding an output terminal portion 366 from light with a mask, it is developed by exposure to ultraviolet light and the photoresist at the output terminal portion 366 is removed.

The second signal leading material portion 356 and the PN semiconductor layer 354 at the output terminal portion 366 are removed by chemical etching, plasma etching or the like so as to expose the first signal leading material portion 352.

Similarly, the PN semiconductor layer 354 except the portion which are to constitute light leading slits 374 are covered with photoresist and the first and second signal leading material layers 352, 356 and the PN semiconductor layer 354 which correspond to the light leading slits 374 are removed by plasma etching or the like to expose the light emitting element 372.

If the width of the light leading slit is not less than twice the height of the light receiving element 358 measured from the surface of the light emitting element 372, it is suitable for detecting the contract.

Lead wires for taking out the output currents from the first signal leading material layer 352 and the second signal leading material layer 356 are then attached to the output terminals 364, 366 by an adhesive, and silicon varnish is finally applied thinly to the entire portion so as to protect the PN semiconductor layer 354 and dried.

As described above, according to the photoelectric encoder of this embodiment, it is possible to constitute a photoelectric encoder of a three-grating system only by two members, namely, the index scale and the main scale. It is thus possible to greatly reduce the number of parts and the size and the weight of the apparatus.

Although, a photoelectric encoder of a three-grating system is mainly explained in each of the embodiments, the present invention is also applicable to an ordinary two-grating type photoelectric encoder.

Furthermore, although a linear encoder is explained in each of the embodiment, the present invention is not restricted thereto and is applicable to a rotary encoder, for example.

As described above, according to the photoelectric encoder of the present invention, since the light emitting element is integrally provided with a grating substrate on the light emission side, it is possible to reduce the size and the weight of the apparatus and the number of parts.

If the light emitting element, the grating substrate on the light emission side, the light receiving element and the grating substrate on the detection side are integrally provided with each other, it is possible to further reduce the size and the weight of the apparatus and the number of parts.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A photoelectric encoder having a main scale with a predetermined reference grating formed thereon and an index scale which is disposed in parallel with said main scale in such a manner as to be relatively movable with respect to said main scale, grating being provided on a light emission side, said photoelectric encoder comprising;

a grating substrate on the light emission side composed of a plate-like laminate of semiconductor layers which have opposite polarities, a film electrode being provided on a side of said grating substrate from which light is emitted, said film electrode having slits provided therein, thus forming light emitting elements;

whereby light restricted by said reference grating and said predetermined grating on the light emission side is received and an amount of relative movement between said main scale and said index scale is output.

2. A photoelectric encoder according to claim 1, wherein
   a surface of said grating substrate on the light emission side which does not face said reference grating is covered with a light shielding material in the form of a thin film.

3. The photoelectric encoder according to claim 1, wherein said photoelectric encoder is a three-grating type photoelectric encoder.

4. A photoelectric encoder according to claim 1, wherein said index scale is provided with a grating on a detection side which faces said grating on the light emission side through said reference grating.

5. A photoelectric encoder according to claim 4, wherein a substrate of said grating on the detection side is composed of light transmissive material, and
   light receiving elements are arranged at regular intervals on a surface of said grating substrate which faces said reference grating.

6. A photoelectric encoder having a main scale with a predetermined reference grating formed thereon and an index scale which is disposed in parallel with said main scale in such a manner as to be relatively movable with respect to said main scale, a grating on a light emission side and a grating on a detection side are formed, said photoelectric encoder comprising:

a grating substrate on the light emission side composed of a plate-like laminate of semiconductor layers which have opposite polarities, a film electrode being provided on a side of said grating substrate from which light is emitted, said film electrode having slits provided therein, thus forming light emitting elements, light receiving elements arranged in alignment at regular intervals on one surface of said grating substrate;

whereby light emitted from said light emitting elements is reflected by said reference grating on said main scale through gaps between said light receiving elements and received by said light receiving elements, and the amount of relative movement of said main scale and said index scale is output.

7. A photoelectric encoder according to claim 6, wherein
a surface of said grating substrate on the light emission side which does not face said reference grating is covered with a light shielding material in the form of a thin film.

8. A photoelectric encoder according to claim 6, wherein said light receiving elements are produced by laminating semiconductor layers which have opposite polarities and providing slits at regular intervals in the thus-produced semiconductor lamination layer.

9. A photoelectric encoder according to claim 6, wherein
said light receiving elements are produced by laminating semiconductor layers which have opposite polarities and providing slits at regular intervals in the thus-produced semiconductor lamination layer, and
signal leading material layers are provided on a surface of each said light receiving element which faces said reference grating and on a boundary surface with said light emitting element.

10. A photoelectric encoder according to claim 6, wherein
said light receiving elements are produced by laminating semiconductor layers which have opposite polarities and providing slits at regular intervals in the thus-produced semiconductor lamination layer,
signal leading material layers are provided on a surface of each said light receiving element which faces said reference grating and on a boundary surface with said light emitting element, and
a width of each of said slits is not less than twice the height each of said light receiving element measured from a surface of said light emitting element.

* * * * *